United States Patent
Reynolds et al.

(10) Patent No.: US 8,256,220 B2
(45) Date of Patent: Sep. 4, 2012

(54) EXHAUST GAS BYPASS VALVE CONTROL FOR THERMOELECTRIC GENERATOR

(75) Inventors: Michael G. Reynolds, Troy, MI (US); Jihui Yang, Lakeshore, CA (US); Greogry P. Meisner, Ann Arbor, MI (US); Francis R. Stabler, Troy, MI (US); Hendrik Pieter (Peter) Jacobus De Bock, Clifton Park, NY (US); Todd Alan Anderson, Niskayuna, NY (US)

(73) Assignees: GM Global Technology Operations LLC, Detroit, MI (US); General Electric Company, Schenectady, NY (US)

( * ) Notice: Subject to any disclaimer, the term of this patent is extended or adjusted under 35 U.S.C. 154(b) by 573 days.

(21) Appl. No.: 12/437,890

(22) Filed: May 8, 2009

(65) Prior Publication Data

US 2010/0281866 A1  Nov. 11, 2010

(51) Int. Cl.
*F01K 17/00* (2006.01)
*F22D 5/00* (2006.01)
*F28B 11/00* (2006.01)

(52) U.S. Cl. ............. 60/686; 60/324; 60/602; 60/605.2; 123/568.21; 136/203; 136/204; 701/108; 701/110

(58) Field of Classification Search .................... 60/602, 60/605.2, 686, 324; 123/568.21; 701/108, 701/110; 136/203, 204
See application file for complete search history.

(56) References Cited

U.S. PATENT DOCUMENTS

| | | | |
|---|---|---|---|
| 6,155,042 A * | 12/2000 | Perset et al. | 60/278 |
| 7,100,369 B2 * | 9/2006 | Yamaguchi et al. | 60/324 |
| 2003/0019470 A1 * | 1/2003 | Anderson et al. | 123/323 |
| 2006/0086080 A1 * | 4/2006 | Katogi et al. | 60/278 |
| 2006/0117740 A1 * | 6/2006 | Okugawa et al. | 60/285 |
| 2006/0213194 A1 * | 9/2006 | Hasegawa | 60/602 |
| 2006/0248889 A1 * | 11/2006 | Sagisaka et al. | 60/602 |
| 2007/0068159 A1 * | 3/2007 | Ueno et al. | 60/605.2 |
| 2009/0126772 A1 * | 5/2009 | Machida | 136/222 |
| 2010/0281866 A1 * | 11/2010 | Reynolds et al. | 60/686 |

* cited by examiner

*Primary Examiner* — John K Kim
(74) *Attorney, Agent, or Firm* — Cantor Colburn LLP

(57) ABSTRACT

A method of controlling engine exhaust flow through at least one of an exhaust bypass and a thermoelectric device via a bypass valve is provided. The method includes: determining a mass flow of exhaust exiting an engine; determining a desired exhaust pressure based on the mass flow of exhaust; comparing the desired exhaust pressure to a determined exhaust pressure; and determining a bypass valve control value based on the comparing, wherein the bypass valve control value is used to control the bypass valve.

8 Claims, 3 Drawing Sheets

EXHAUST GAS BYPASS VALVE CONTROL FOR THERMOELECTRIC GENERATOR

GOVERNMENT RIGHTS

This invention was made with Government support under U.S. Government contract DE-FC26-04NT 42278 awarded by the United States Department of Energy. The Government has certain rights in this invention.

FIELD OF THE INVENTION

Exemplary embodiments of the present invention are related to methods and systems for controlling an exhaust gas bypass valve and more specifically, to methods and systems for controlling an exhaust gas bypass valve for thermoelectric power generation.

BACKGROUND

The electricity requirement in vehicles is increasing due to the demands of enhanced performance, on-board controls and comforts (e.g., stability controls, telematics, navigation systems, electronic braking, etc.). Conventional internal combustion engines are inefficient in energy use. In some cases, the unused energy of the engine can be used to power the electrical loads in the vehicle.

In one example, thermoelectric devices are being incorporated into the exhaust system of the vehicle to convert waste-heat into usable energy. However, simply disposing the thermoelectric device in the exhaust stream of the vehicle may negatively impact engine efficiency and performance due to increase in exhaust back-pressure load and potentially places the thermoelectric device at risk due to high exhaust temperatures.

SUMMARY OF THE INVENTION

A method of controlling engine exhaust flow through at least one of an exhaust bypass and a thermoelectric device via a bypass valve is provided. The method includes: determining a mass flow of exhaust exiting an engine; determining a desired exhaust pressure based on the mass flow of exhaust; comparing the desired exhaust pressure to a determined exhaust pressure; and determining a bypass valve control value based on the comparing, wherein the bypass valve control value is used to control the bypass valve.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
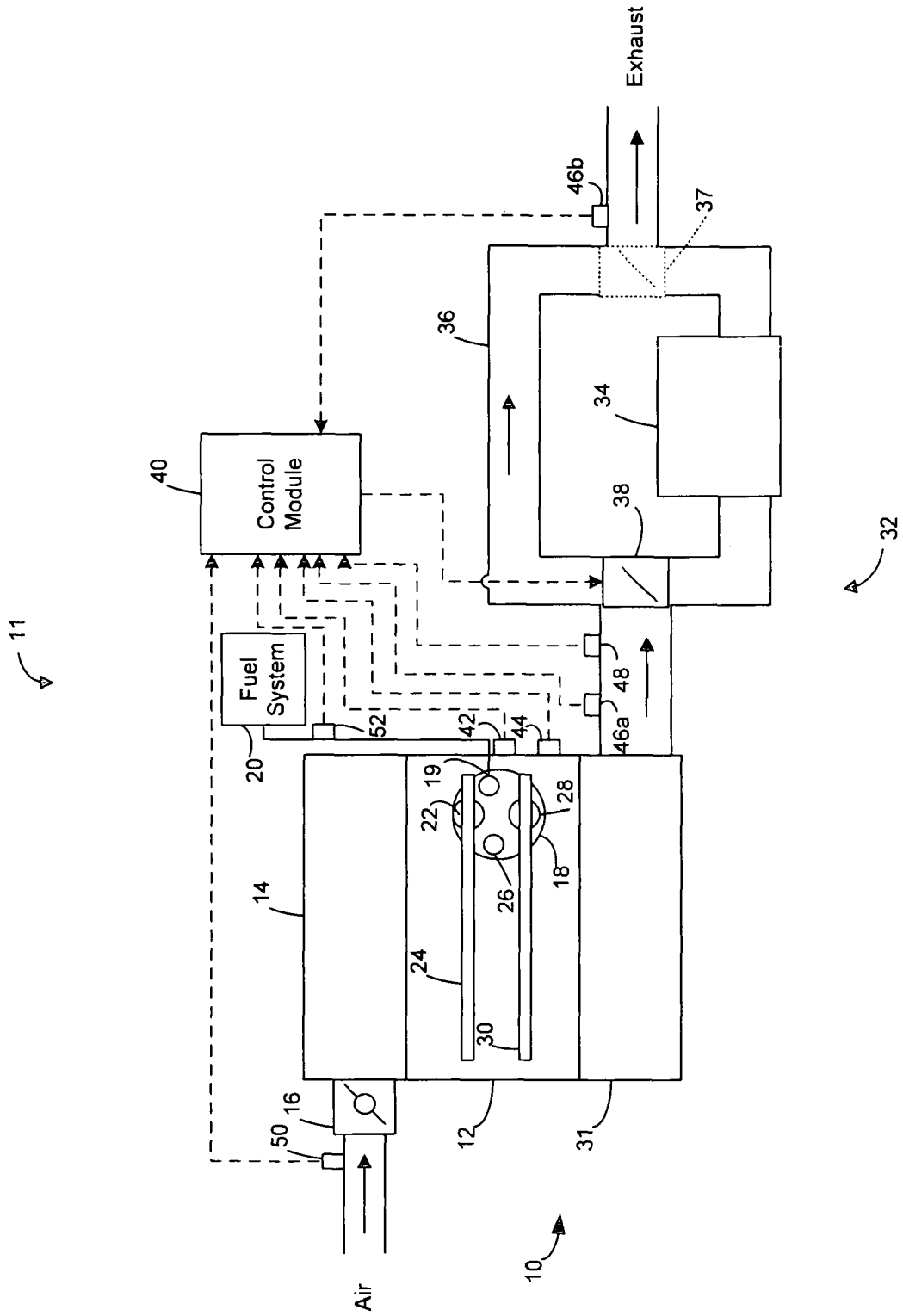
FIG. 1 is a functional block diagram illustrating a vehicle that includes a bypass valve control system in accordance with an exemplary embodiment.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary engine system 10 of a vehicle 11 includes an engine 12 that combusts an air and fuel mixture to produce drive torque. As can be appreciated, the exhaust gas bypass control valve system is applicable to various engine systems and is not limited to the present example.

In the example engine system 10 shown in FIG. 1, air is drawn into an intake manifold 14 through a throttle 16. The throttle 16 regulates mass airflow into the intake manifold 14. Air within the intake manifold 14 is distributed into cylinders 18. Although a single cylinder 18 is illustrated, it can be appreciated that the exhaust gas bypass valve control system of the present disclosure can be implemented in engines 12 having a plurality of cylinders 18 including, but not limited to, 2, 3, 4, 5, 6, 8, 10 and 12 cylinders.

A fuel injector 19 injects fuel that is combined with the air as it is drawn into the cylinder 18 through an intake port. The fuel injector 19 may be an injector associated with an electronic or mechanical fuel injection system 20, a jet or port of a carburetor or another system for mixing fuel with intake air. The fuel injector 19 is controlled to provide a desired air-to-fuel (A/F) ratio within each cylinder 18.

An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust camshaft 30. The exhaust exits the engine 12 through an exhaust manifold 31, is treated in an exhaust system 32, and is released to atmosphere.

The exhaust system 32 includes a thermoelectric device, such as, a thermoelectric generator 34, a bypass 36, and a bypass valve 38. The thermoelectric generator 34 is disposed between the engine 12 and, for example, a muffler (not shown). The thermoelectric generator 34 receives hot exhaust gas from the engine 12 and converts the hot gas to electrical energy. The electrical energy may be used to power one or more electrical components (not shown) of the vehicle 11. The bypass 36 is provided to divert excess exhaust gas from the thermoelectric generator 34. The bypass valve 38 is selectively controlled to allow the exhaust to flow through the bypass 36, the thermoelectric generator 34, or both. The exhaust bypass valve 38 as shown in FIG. 1 is disposed in a position in the exhaust system 32 between the exhaust manifold 31 and the thermoelectric generator 34. An alternative embodiment disposes the exhaust bypass valve 38 at a position where the exhaust pipe exiting the thermoelectric generator 34 rejoins with the exhaust bypass as shown in phantom at 37 of FIG. 1.

A control module 40 controls the operation of the engine system 10 and/or the exhaust system 32 based on one or more sensory input signals generated by one or more system sensors. For example, an engine speed sensor 42 generates an engine speed signal based on a rotational speed of the engine 12. An engine coolant temperature sensor 44 generates an engine coolant temperature signal based on a temperature of coolant fluids present in the engine 12. An exhaust pressure sensor 46a or sensors 46a and 46b generate a pressure signal or signals based on a measured pressure or pressures of exhaust in the exhaust system 32. An exhaust temperature sensor 48 generates an exhaust temperature signal based on a measured temperature of the exhaust at a suitable location between the engine 12 and the thermoelectric generator 34. A mass airflow sensor 50 generates a mass airflow signal based on a measured amount of air entering the engine 12. A mass fuel flow sensor 52 generates a mass fuel flow signal based on an amount of fuel entering the engine 12. As can be appreciated, one or more of the above listed sensor signals can be modeled or measured based on other sensor signals.

As can be appreciated, relevant exhaust pressures may be measured or modeled with respect to atmospheric pressure or a pressure within the exhaust system 32. For example, pressure of the exhaust may be measured immediately upon exit of the exhaust valve 28 relative to the atmospheric pressure. In another example, the exhaust pressure is measured or modeled immediately before the bypass valve 38, relative to the exhaust pressure measured at the exit of the thermoelectric generator 34, for example where the exhaust pipe exiting the thermoelectric generator 34 joins the bypass 36.

In various embodiments, the control module 40 receives the above signals and selectively controls the bypass valve 38 such that damage to the thermoelectric generator 34 and/or engine 12 is prevented and/or engine inefficiency due to high-levels of back-pressure is minimized.

Figure 2:
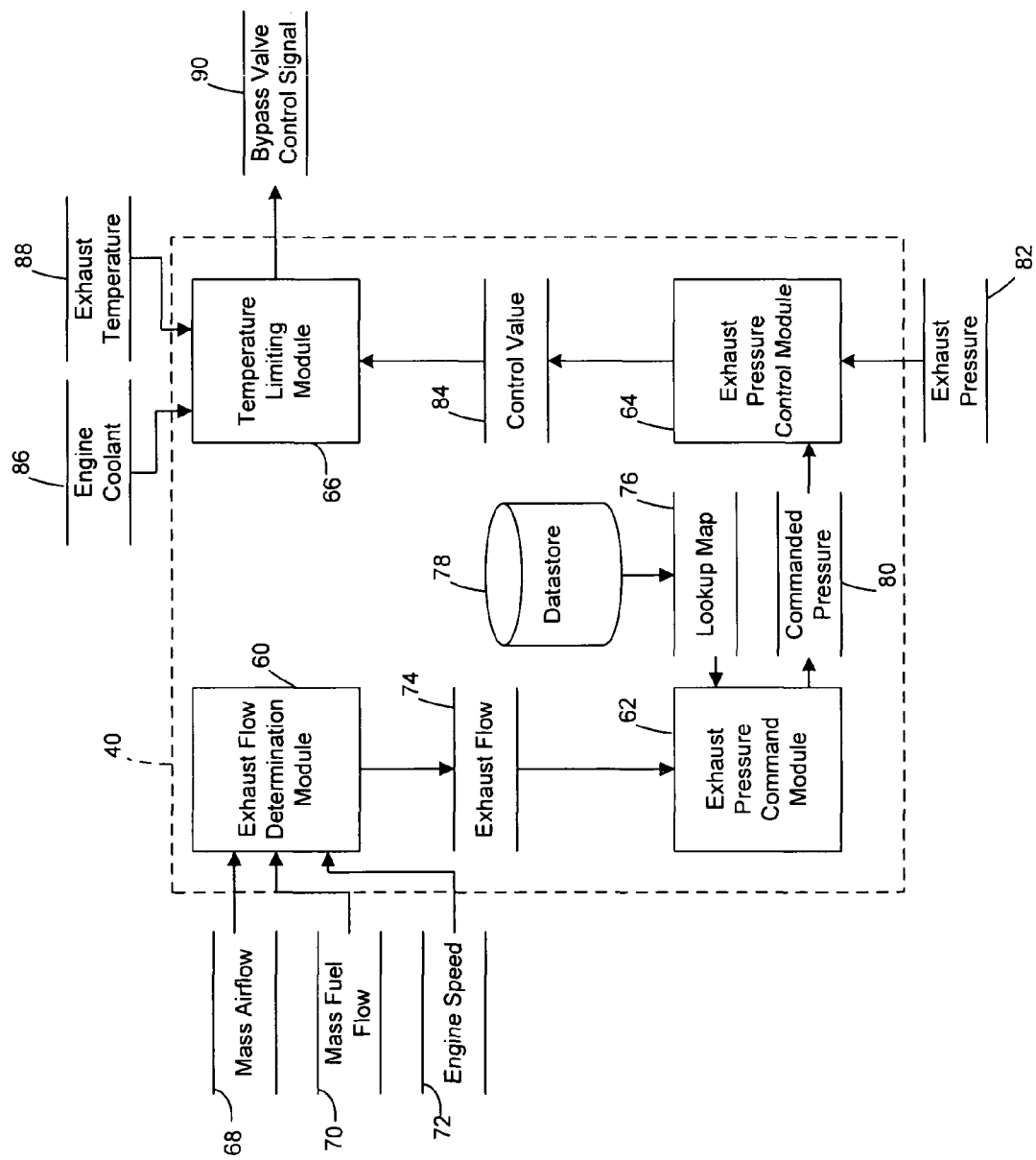
FIG. 2 is a dataflow diagram illustrating a control module of the vehicle of FIG. 1 in accordance with an exemplary embodiment.

Referring now to FIG. 2, the control module 40 is shown in more detail in accordance with an exemplary embodiment. In various embodiments, the control module 40 can include one or more sub-modules and datastores. As can be appreciated, the sub-modules shown in FIG. 2 can be combined and/or further partitioned to similarly control the bypass valve 38 (FIG. 1). In this example, the control module 40 includes an exhaust flow determination module 60, an exhaust pressure command module 62, an exhaust pressure control module 64, and a temperature limiting module 66.

The exhaust flow determination module 60 receives as input mass airflow 68, mass fuel flow 70, and engine speed 72. The exhaust flow determination module 60 determines an exhaust flow 74 by, for example, computing a summation of the mass airflow 68 and the mass fuel flow 70. The exhaust flow determination module 60 then adjusts the exhaust flow 74 for time delays based on the engine speed 72.

The exhaust pressure command module 62 receives as input the exhaust flow 74. The exhaust pressure command module 62 interfaces with a lookup map 76 that is stored in a datastore 78. In various embodiments, the lookup map 76 is a one-dimensional lookup map that is indexed by the exhaust flow 74. Based on the lookup map 76 and the current exhaust flow 74, the exhaust pressure command module 62 determines a desired exhaust pressure to be commanded (herein referred to as commanded exhaust pressure 80).

The exhaust pressure control module 64 receives as input the commanded exhaust pressure 80 and an exhaust pressure 82. The exhaust pressure 82 can be measured or modeled as discussed above. The exhaust pressure control module 64 determines a control value 84 that is used to control the bypass valve 38 (FIG. 1). In various embodiments, the control value 84 is a duty cycle with a range from zero percent (e.g., corresponding to a valve position forcing the maximum exhaust flow 74 through the thermoelectric generator 34) to one hundred percent (e.g., corresponding to a valve position forcing a maximum exhaust flow 74 through the bypass 36). The exhaust pressure control module 64 determines the control value 84 by comparing the commanded exhaust pressure 80 to the exhaust pressure 82 to determine a difference between the commanded exhaust pressure 80 and the exhaust pressure 82. In various embodiments, the exhaust pressure control module 64 applies proportional and integral gains to the difference to determine the control value 84.

The temperature limiting module 66 receives as input the control value 84, measured or modeled engine coolant temperature 86, and measured or modeled exhaust temperature 88. The temperature limiting module 66 limits the control value to a default value (e.g., zero percent) when temperatures in the exhaust system exceed a predetermined threshold, thus, placing the components of the thermoelectric generator 34 (FIG. 1) at risk. For example, the temperature limiting module 66 generates a control signal 90 that limits the control value 84 to a default value when the engine coolant temperature 86 is greater than a first predetermined value or when the exhaust temperature 88 is greater than a second predetermined value. Otherwise, the temperature limiting module 66 generates the control signal 90 based on the control value 84 determined by the exhaust pressure control module 64.

Figure 3:
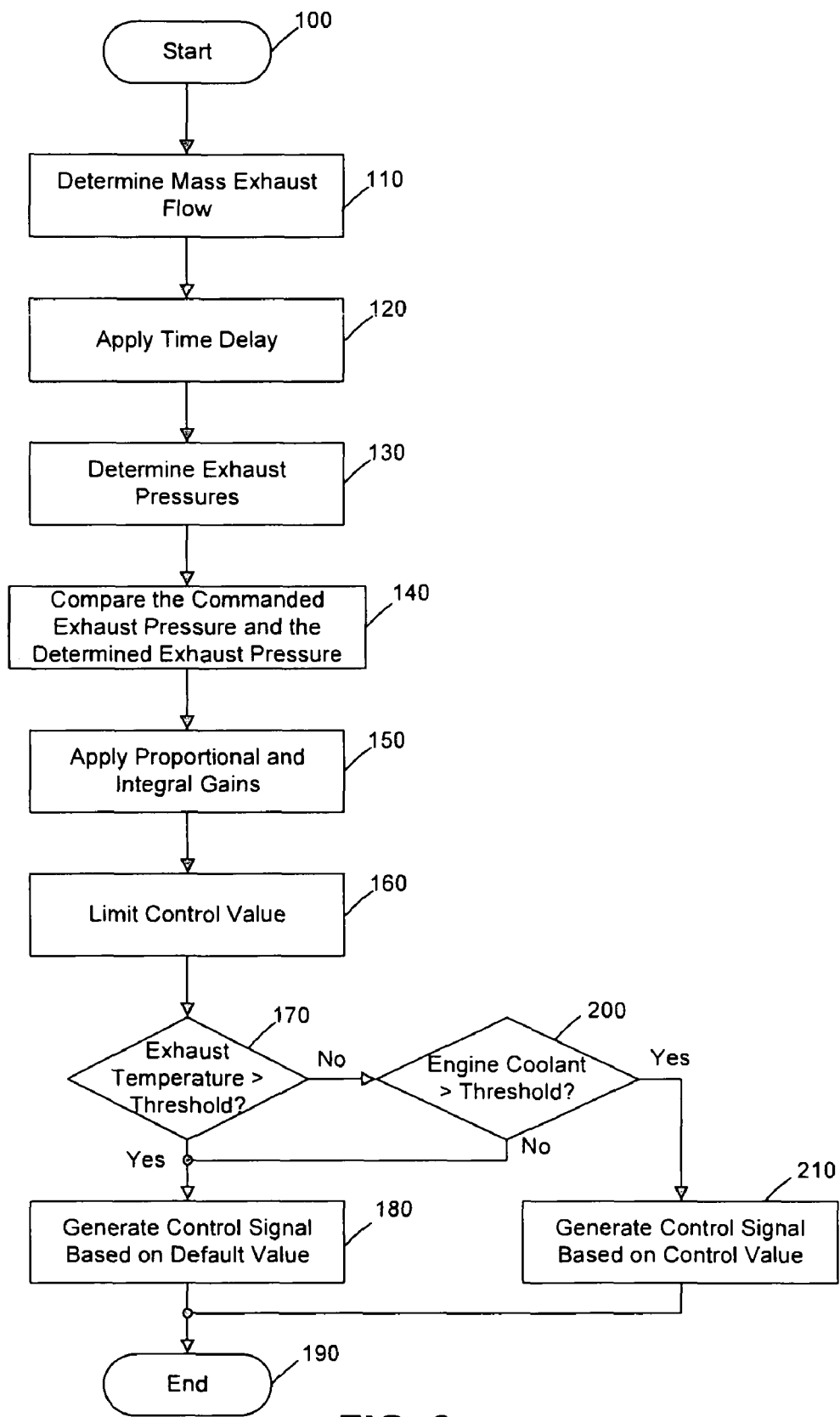
FIG. 3 is a flowchart illustrating a bypass valve control method that can be performed by the control module of FIG. 2 in accordance with an exemplary embodiment.

Turning now to FIG. 3 and with continued reference to FIG. 2, a flowchart illustrates a bypass valve control method that can be performed by the control module 40 of FIG. 2 in accordance with various aspects of the present disclosure. As can be appreciated in light of the disclosure, the order of operation within the method is not limited to the sequential execution as illustrated in FIG. 2, but may be performed in one or more varying orders as applicable and in accordance with the present disclosure.

In one example, the method may begin at 100. The exhaust flow 74 is determined at 110. The time delay based on engine speed 72 is applied to determine the exhaust flow 74 in the vicinity of the thermoelectric generator 34, which may be located a distance away from the engine 12 at 120. The commanded exhaust pressure 80 is determined based on the lookup map 76 and the exhaust pressure 82 is determined, for example, based on an exhaust pressure at a first location relative to an exhaust pressure at a second location as discussed above at 130. Thereafter, the difference between the commanded exhaust pressure 80 and the exhaust pressure 82 is determined at 140. Proportional and integral gains are applied to the difference at 150, to determine the control value 84. The control value 84 is limited between a control range (e.g., between zero and one hundred percent duty cycle) at 160. Thereafter, the control value 84 is defaulted based on high engine coolant temperatures 86 or high exhaust temperatures 88 at 170-210. In this embodiment, the default value corresponds to a bypass valve control signal of one hundred percent, forcing the maximum exhaust flow through the bypass 36.

For example, if the exhaust temperature 88 is greater than a predetermined threshold at 170, the control value 84 is set to the default value and the control signal 90 is generated based on the default control value at 180. Thereafter, the method may end at 190.

However, if the exhaust temperature 88 is less than the predetermined threshold at 170, but the engine coolant temperature 86 is greater than a predetermined threshold at 200, the control value 84 is set to a default value and the control signal 90 is generated based on the default control value at 180. Thereafter, the method may end at 190.

Otherwise, if the exhaust temperature 88 is less than the predetermined value at 170 and the engine coolant temperature 86 is less than the predetermined value at 200, the control signal 90 is generated based on the current control value 84 at 210 and the method may end at 190.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of controlling engine exhaust flow through at least one of an exhaust bypass and a thermoelectric device via a bypass valve, comprising:
   determining a mass flow of exhaust exiting an engine;
   determining a desired exhaust pressure based on the mass flow of exhaust;
   comparing the desired exhaust pressure to an exhaust pressure; and
   determining a bypass valve control value based on the comparing, wherein the bypass valve control value is used to control the bypass valve, and the bypass valve diverts a portion of the exhaust gas to an exhaust pipe.

2. The method of claim 1 wherein the determining the mass flow of exhaust is based on at least one of, a measured intake airflow, a measured fuel flow, a modeled intake airflow, a modeled fuel flow, and a measured exhaust flow.

3. The method of claim 1 wherein the determining the mass flow of exhaust further comprises adjusting the mass flow of exhaust for a time delay based on engine speed.

4. The method of claim 1 wherein the determining the desired exhaust pressure is further based on a one-dimensional lookup map indexed by the mass flow of exhaust.

5. The method of claim 1 further comprising limiting the control value based on at least one of engine coolant temperature and exhaust gas temperature.

6. The method of claim 1 further comprising determining the exhaust pressure based on an exhaust pressure at a first location relative to an exhaust pressure at a second location.

7. The method of claim 1 wherein the comparing further comprises determining a difference between the desired exhaust pressure and the exhaust pressure, and wherein the determining the control value is based on the difference.

8. The method of claim 7 further comprising applying proportional and integral gains to the control value.

\* \* \* \* \*